(12) United States Patent
Kernbaum et al.

(10) Patent No.: US 10,655,670 B2
(45) Date of Patent: May 19, 2020

(54) EFFICIENT BOWDEN CABLE SYSTEM

(71) Applicant: SRI International, Menlo Park, CA (US)

(72) Inventors: Alexander Steele Kernbaum, Sunnyvale, CA (US); Roy Kornbluh, Palo Alto, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 16/233,237

(22) Filed: Dec. 27, 2018

(65) Prior Publication Data

US 2019/0128314 A1    May 2, 2019

Related U.S. Application Data

(62) Division of application No. 15/572,974, filed as application No. PCT/US2016/031706 on May 11, 2016, now Pat. No. 10,443,646.

(Continued)

(51) Int. Cl.
*F16C 1/10* (2006.01)
*F16C 1/12* (2006.01)
(Continued)

(52) U.S. Cl.
CPC ............... *F16C 1/103* (2013.01); *F16C 1/10* (2013.01); *F16C 1/12* (2013.01); *F16C 1/18* (2013.01); *F16C 1/26* (2013.01); *F16C 1/262* (2013.01)

(58) Field of Classification Search
CPC .... F16C 1/18; F16C 1/10; F16C 1/102; F16C 1/103; F16C 1/105; F16C 1/12;
(Continued)

(56) References Cited

U.S. PATENT DOCUMENTS 3,290,013 A    12/1966    Walsh et al.
3,552,682 A    1/1971    Walsh
(Continued)

FOREIGN PATENT DOCUMENTS

DE    2803807 A1    8/1979
DE    2921923    12/1980
(Continued)

OTHER PUBLICATIONS

Machine Translation of FR 703627, obtained Mar. 21, 2019.*
(Continued)

*Primary Examiner* — Richard W Ridley
*Assistant Examiner* — Brian J McGovern
(74) *Attorney, Agent, or Firm* — McDonnell Boehnen Hulbert & Berghoff LLP

(57) ABSTRACT

An apparatus includes a housing that includes an inner space, an inlet connected to the inner space, and a plurality of outlets connected to the inner space. The housing allows an inner cable of a Bowden cable to pass therethrough such that the inner cable passes through the inlet, the inner space, and any of the plurality of outlets. The apparatus also includes an inner hub rotatably mounted in the inner space of the housing. The inner hub is configured to receive and guide the inner cable passing through the housing such that the inner cable forms a curved path about the inner hub. The apparatus includes a socket configured to receive the Bowden cable. The socket can be coupled to the housing at a plurality of different positions to select any of the plurality outlets such that the inner cable of the Bowden cable passes through the selected outlet.

10 Claims, 16 Drawing Sheets

Related U.S. Application Data

(60) Provisional application No. 62/159,850, filed on May 11, 2015.

(51) Int. Cl.
*F16C 1/26* (2006.01)
*F16C 1/18* (2006.01)

(58) Field of Classification Search
CPC .... F16C 1/14; F16C 1/145; F16C 1/16; F16C 1/20; F16C 1/22; F16C 1/223; F16C 1/226; F16C 1/26; F16C 1/262; B66D 2700/0183; B66D 2700/0191; B66D 1/34; B66D 1/38; E05F 11/483; E05F 11/486; E05F 11/488; E05F 11/481
See application file for complete search history.

(56) References Cited

U.S. PATENT DOCUMENTS

| | | | |
|---|---|---|---|
| 3,954,022 A | 5/1976 | Hemens | |
| 4,314,692 A * | 2/1982 | Brauer | E05F 11/486 254/362 |
| 4,429,590 A | 2/1984 | Kopich | |
| 5,094,123 A | 3/1992 | Latham | |
| 5,624,334 A | 4/1997 | Lumpkin | |
| 5,855,529 A | 1/1999 | Sugimoto | |
| 6,038,817 A | 3/2000 | Scheck et al. | |
| 2006/0037247 A1* | 2/2006 | Heyer | E05F 11/483 49/352 |
| 2016/0121988 A1 | 5/2016 | Gai et al. | |

FOREIGN PATENT DOCUMENTS

| | | | |
|---|---|---|---|
| DE | 19956071 | 5/2001 | |
| DE | 202014105161 | 12/2014 | |
| FR | 703627 A * | 5/1931 | ............... F16C 1/10 |
| GB | 2029502 A | 3/1980 | |
| JP | S55-036600 | 3/1980 | |
| JP | S57-176920 | 11/1982 | |
| JP | 63252879 A * | 10/1988 | ............. F16C 1/226 |
| JP | H06-32664 | 4/1994 | |
| JP | 06-148437 | 5/1994 | |
| JP | 06-043186 | 6/1994 | |

OTHER PUBLICATIONS

Machine Translation of JP 63-252879, obtained Oct. 21, 2019.*
European Search Report, European Patent Application No. 16793386.0, dated Nov. 6, 2018, 7 pages.
The International Search Report (ISR) with Written Opinion for PCT/US2016/031706 dated Aug. 19, 2016, pp. 1-9.

* cited by examiner

EFFICIENT BOWDEN CABLE SYSTEM

CROSS REFERENCE TO RELATED APPLICATIONS

The present application is a division of U.S. patent application Ser. No. 15/572,974, which is the U.S. national phase of International Application No. PCT/US2016/031706, filed May 11, 2016, which claims priority to U.S. Provisional Patent Application No. 62/159,850, filed May 11, 2015. The foregoing applications are incorporated herein by reference.

BACKGROUND

Mechanical power transmission systems could employ flexible drive trains to transfer power from one point to another through bends. For example, there are several applications in which an operating mechanism is connected to a remotely located device by means of a flexible cable. The cable transmits pulling and/or pressure forces from one point to another.

SUMMARY

The present disclosure describes embodiments that relate to systems and apparatuses associated with an efficient Bowden cable.

In one aspect, the present disclosure describes an apparatus. The apparatus includes a housing that includes an inner space, an inlet connected to the inner space, and a plurality of outlets connected to the inner space. The housing allows an inner cable of a Bowden cable to pass therethrough such that the inner cable passes through the inlet, the inner space, and any of the plurality of outlets. The apparatus also includes an inner hub rotatably mounted in the inner space of the housing. The inner hub is configured to receive and guide the inner cable passing through the housing such that the inner cable forms a curved path about the inner hub. The apparatus further includes a socket configured to receive the Bowden cable. The socket can be coupled to the housing at a plurality of different positions to select any of the plurality outlets such that the inner cable of the Bowden cable passes through the selected outlet.

In another aspect, the present disclosure describes another apparatus. The apparatus includes a housing that includes an inner space, an inlet connected to the inner space, and an outlet slot connected to the inner space. The housing allows an inner cable of a Bowden cable to pass therethrough such that the inner cable passes through the inlet, the inner space, and the outlet slot. The apparatus also includes an inner hub rotatably mounted in the inner space of the housing. The inner hub is configured to receive and guide the inner cable passing through the housing such that the inner cable forms a curved path about the inner hub. The apparatus further includes a socket configured to receive the Bowden cable. The socket can be coupled to the housing at a plurality of different positions to select any of a plurality of different portions of the outlet slot such that the inner cable of the Bowden cable passes through the selected portion of the outlet slot.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

I. OVERVIEW

In the field of mechanical power transmissions, there is often a need for light weight, highly efficient components. Flexible drive trains are beneficial in my applications. Example applications include assistive devices, such as exoskeleton-based devices, and robots. In these applications, a power source may be located at a particular location, and power is transmitted about a body of a human or robot to an actuator to perform an operation. Flexible structures that are capable of generating forces along their length may be suitable for such applications. An example of such a flexible structure is a Bowden cable.

Figure 1:
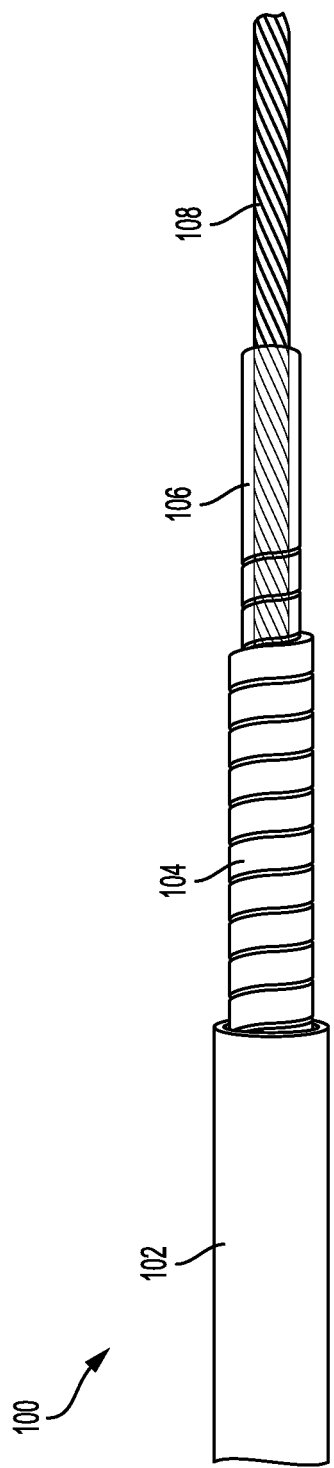
FIG. 1 illustrates a cut-away of a Bowden cable, in accordance with an example implementation.

A Bowden cable is a type of flexible cable used to transmit mechanical force or motion by the movement of an inner cable relative to a hollow outer sheath. FIG. 1 illustrates a cut-away of a Bowden cable 100, in accordance with an example implementation. As shown in FIG. 1, the Bowden cable 100 includes protective plastic coating or sheath 102, a steel structure sleeve 104, an inner lining 106 that could be made of a plastic (e.g., Teflon) to reduce friction, and an inner cable 108. The sheath 102, the steel sleeve 104 and the inner lining 106 may collectively be referred to as a housing or sleeve of the Bowden cable.

The Bowden cable 100 can be used to transmit mechanical force or energy by the movement of the inner cable 108 relative to the housing, i.e., relative to the sheath 102, the steel sleeve 104, and the lining 106. In examples, the steel sleeve 104 may include a coil spring as illustrated in FIG. 1. When the inner cable 108 is under tension, the inner cable 108 compresses the coil spring, thus placing the steel sleeve 104 under compression.

Bowden cables, such as the Bowden cable 100, have several advantages. The first advantage is remote actuation. For instance, many robot systems suffer adversely from the mass and moment of inertia of actuators and transmission systems because they affect the dynamic properties of the system. The mass and moment of inertia especially degrade the dynamic transparency of wearable robots. By using a Bowden cable, actuators can be placed far away from end-effectors, thus reducing the weight and inertia and increase the power density.

The second advantage is flexibility. Most mechanical transmission systems, such as gear trains, belts, and tendon-pulleys, are rigid, and thus the configuration of such systems is fixed. However, since the only interaction between a Bowden cable and other systems or environment is at its two ends where the ends are clamped, the cable is flexible and free to move between the two ends, thus increasing the range of motion of end-effectors.

However, a disadvantage of using a Bowden cable is its nonlinear characteristics due to cable and sheath compliance and the friction between its inner cable (e.g., the inner cable) 108 and the sleeve (e.g., the sleeve 104 and the outer sheath 102). These characteristics degrade the performance of the transmission system.

Figure 2:
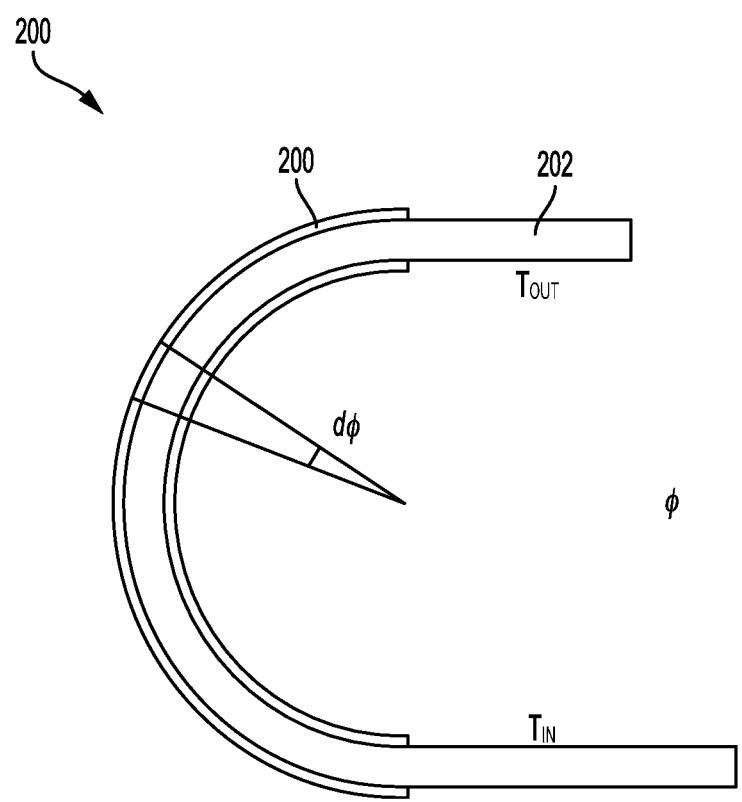
FIG. 2 shows a simplified Bowden cable to illustrate friction calculations, in accordance with an example implementation.

FIG. 2 shows a simplified Bowden cable to illustrate friction calculations, in accordance with an example implementation. The Bowden cable has a sheath 200 and an inner wire or cable 202. The Bowden cable is bent at an angle φ (e.g., 180° as shown in FIG. 2). The inner cable 202 is subjected to an input tension $T_{in}$ at one end, which is transmitted to the other end of the inner cable 202 as $T_{out}$. However, because of friction losses, $T_{out}$ is not equal to $T_{in}$. Particularly, $T_{out}$ could be calculated by the following equation:

$$T_{out} = e^{-\mu\phi} T_{in} \quad (1)$$

where e is the base of the natural logarithm and μ is a friction coefficient. According to equation (1), friction losses grow exponentially (i.e., $T_{out}$ is reduced further relative to $T_{in}$) as the bend angle φ increases. In practice, the efficiency of a Bowden cable in transmitting force can be as low as 25% for large-angle bends.

Disclosed herein are apparatuses and systems configured to reduce friction during transmission of power by a Bowden cable to improve efficiency and reduce energy losses. The implementations illustrated herein (e.g., apparatuses 300 and 500 shown in FIGS. 3A-3F and 5A-5F) are described with reference to Bowden cables. However, the apparatuses and systems described herein could be used to reduce friction of other types of flexible cables or rigid compression hollow tubes instead of a Bowden cable.

II. EXAMPLE APPARATUS CONFIGURATION

Figure 3A:
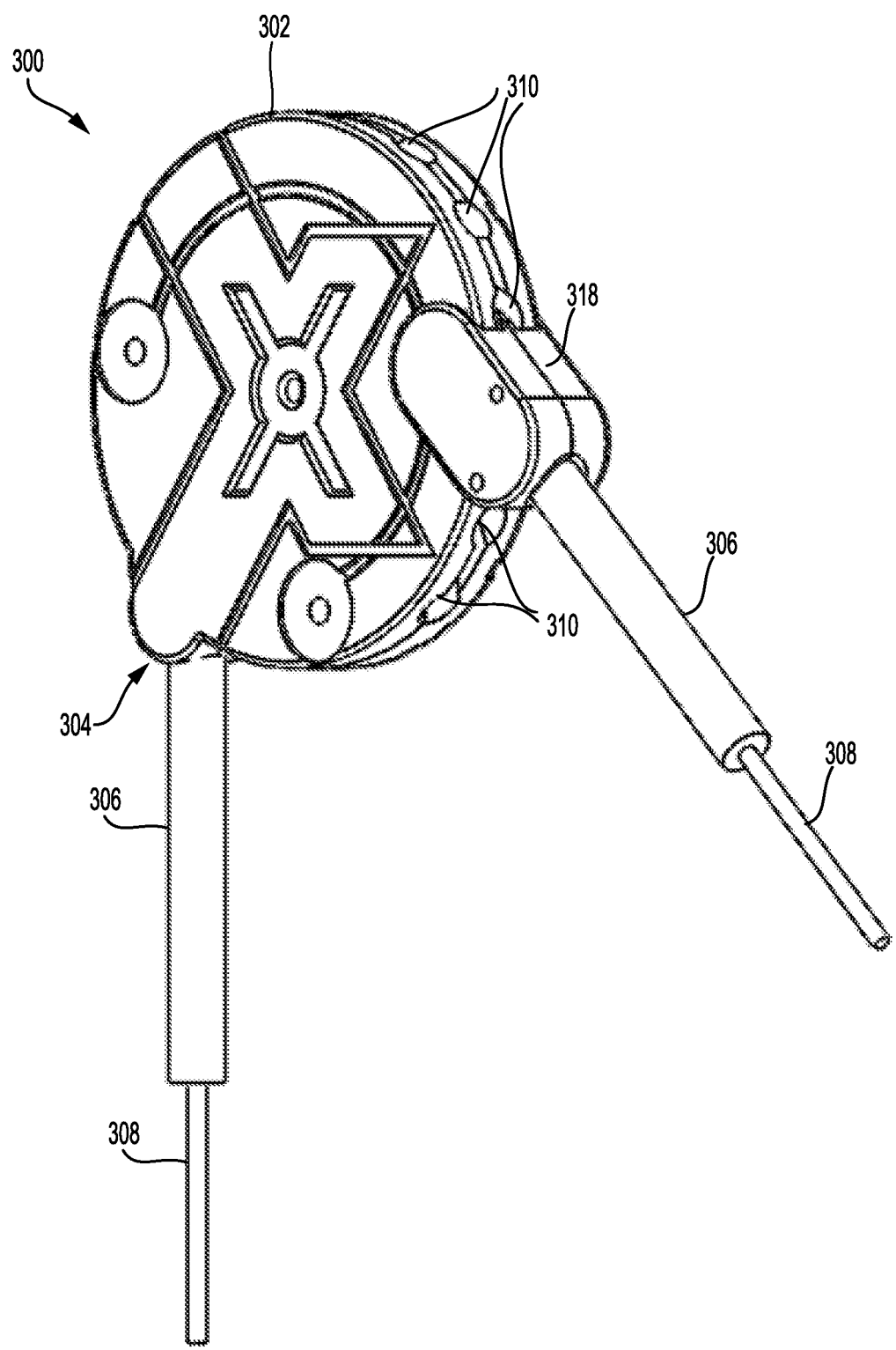
FIG. 3A illustrates a perspective view of an apparatus configured to reduce friction in a Bowden cable, in accordance with an example implementation.

FIGS. 3A, 3B, 3C, 3D, 3E, and 3F illustrate an apparatus 300 configured to reduce friction in a Bowden cable, in accordance with an example implementation. FIG. 3A illustrates a perspective view of the apparatus 300. As shown in FIG. 3A, the apparatus 300 includes a housing 302. The housing 302 is shown as a generally circular body, but could have other shapes as well. The housing 302 has an inlet 304 configured to receive a Bowden cable having a sleeve 306 and an inner cable 308. Particularly, the housing 302 allows the inner cable 308 to pass therethrough such that the inner cable passes through the inlet 304, an inner space within the housing 302, and any of a plurality of outlets 310. The plurality of outlets 310 span a portion of a circumference or a peripheral surface of the housing 302. The sleeve 306 may, for example, be similar to the sleeve 102 and/or the steel sleeve 104 discussed with respect to FIG. 1.

Figure 3B:
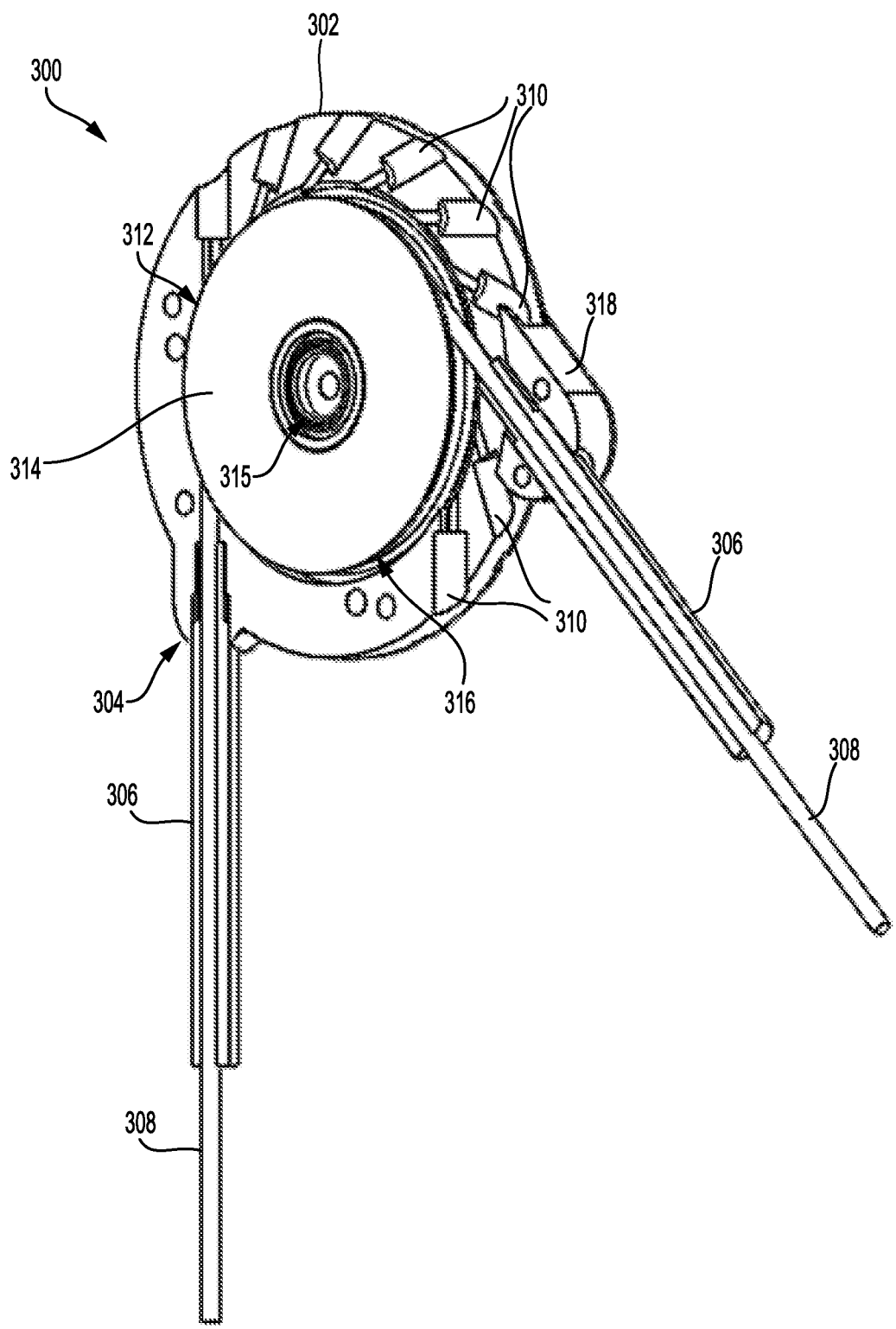
FIG. 3B illustrates a perspective view of a portion of the apparatus in FIG. 3A, in accordance with an example implementation.

FIG. 3B illustrates a perspective view of a cross section of the apparatus 300. As shown, the housing 302 has an inner space 312. In an example, the housing 302 may be formed of two opposing circular plates having the inner space 312 therebetween, or may be formed as a single generally circular body having the inner space 312 therein.

The apparatus 300 includes an inner hub 314 that is rotatably mounted in the inner space 312 of the housing 302. Particularly, the inner hub 314 may be mounted on a roller bearing (e.g., ball bearing) 315. Pure rolling friction of the bearing 315 reduces friction resulting due to rotation of the inner hub 314 and increases efficiency of the apparatus 300.

In an example, the inner hub 314 may have a circular groove 316 disposed on a periphery of the inner hub 314. The circular groove 316 is configured to receive and guide the inner cable 308 of the Bowden cable, such that the inner cable 308 forms a curved path about the inner hub 314. In another example, the inner hub 314 might not have a groove, and the inner cable 308 could form the curved path about a periphery of the inner hub 314 itself.

The apparatus 300 also includes a socket 318 configured to receive the Bowden cable emanating through one of the outlets 310. The socket 318 can be coupled to the housing 302 at a plurality of different positions to select any of the plurality outlets 310 such that the inner cable 308 of the Bowden cable passes through the selected outlet. In this manner, the inner cable 308 emanating from the socket 318 forms an angle to the incoming cable received at the inlet 304 to route the Bowden cable.

Figure 3C:
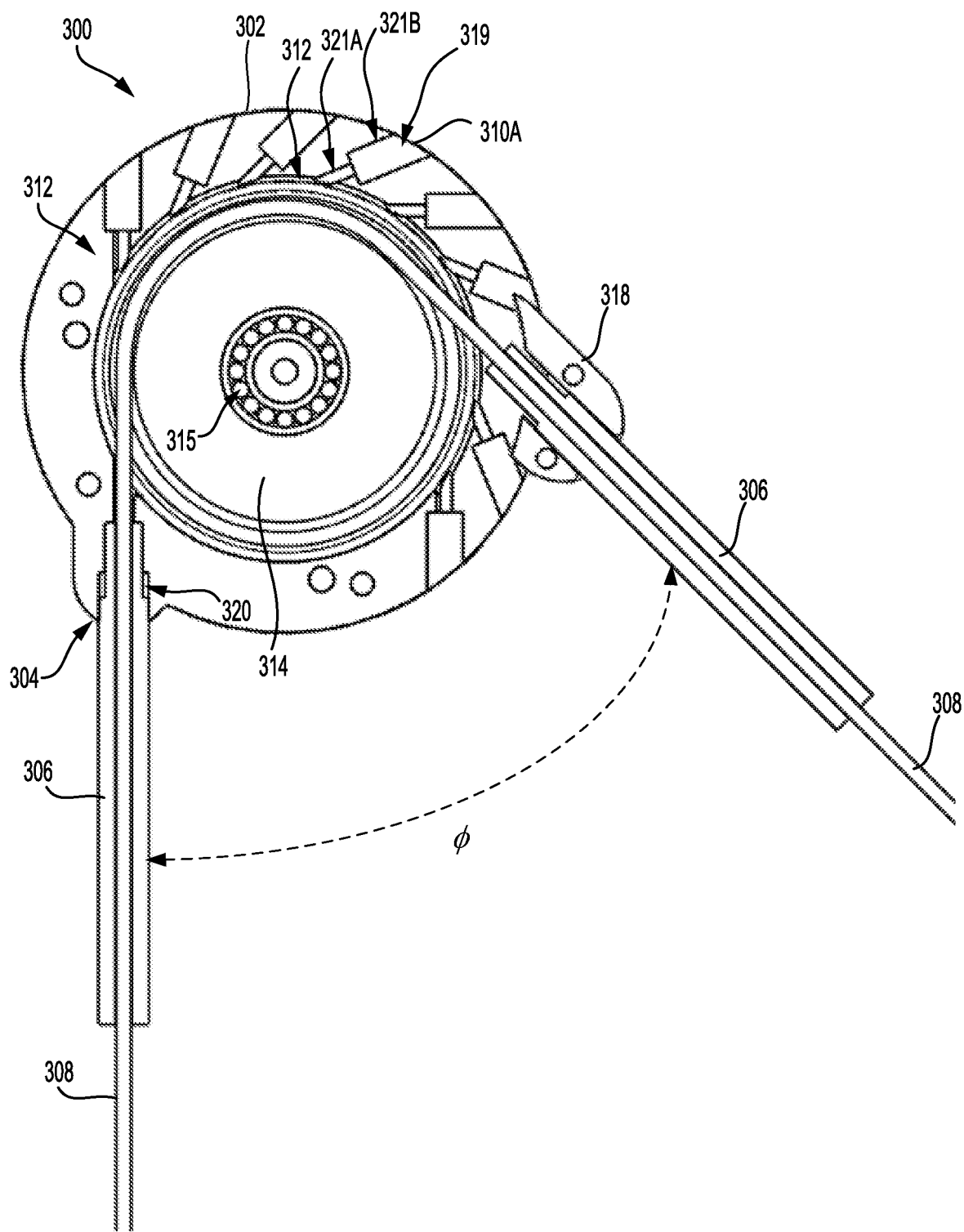
FIG. 3C illustrates a side view of the apparatus shown FIG. 3B, in accordance with an example implementation.

FIG. 3C illustrates a side view of the cross section shown in FIG. 3B. FIG. 3C is used to illustrate the construction of the outlets 310 and changing an angle φ of the Bowden cable by way of moving the socket 318 about the periphery of the housing 302.

As shown in FIG. 3C, an outlet 310A of the plurality of outlets 310 is connected to the inner space 312 and the inner hub 314 via a channel 319. Similar channels connect the other outlets 310 to the inner space 312 as well. Further, a similar channel 320 connects the inlet 304 to the inner space 312.

As shown, the channel 319 could have variable diameter along its length. For instance, the channel 319 may include a first portion 321A extending radially from the inner space 312 and configured to accommodate the inner cable 308. In other words, a diameter of the first portion 321A is equal to or slightly larger than a diameter of the inner cable 308. The channel 319 may also include a second portion 321B extending from an end of the first portion 321A to the circumference of the housing 302, thus forming the outlet 310A at the circumference.

In an example, a diameter of the second portion 321B may be larger than the diameter of the inner cable 308, but less than a diameter of the sleeve 306. Thus, the channel 319 is wider than the inner cable 308 and narrower than the sleeve 306. In another example implementation, however, the second portion 321B may be configured to accommodate the sleeve 306 of the Bowden cable such that a portion of the sleeve 306 is inserted in the second portion 321B when the socket 318 is coupled to the housing 302.

Figure 3D:
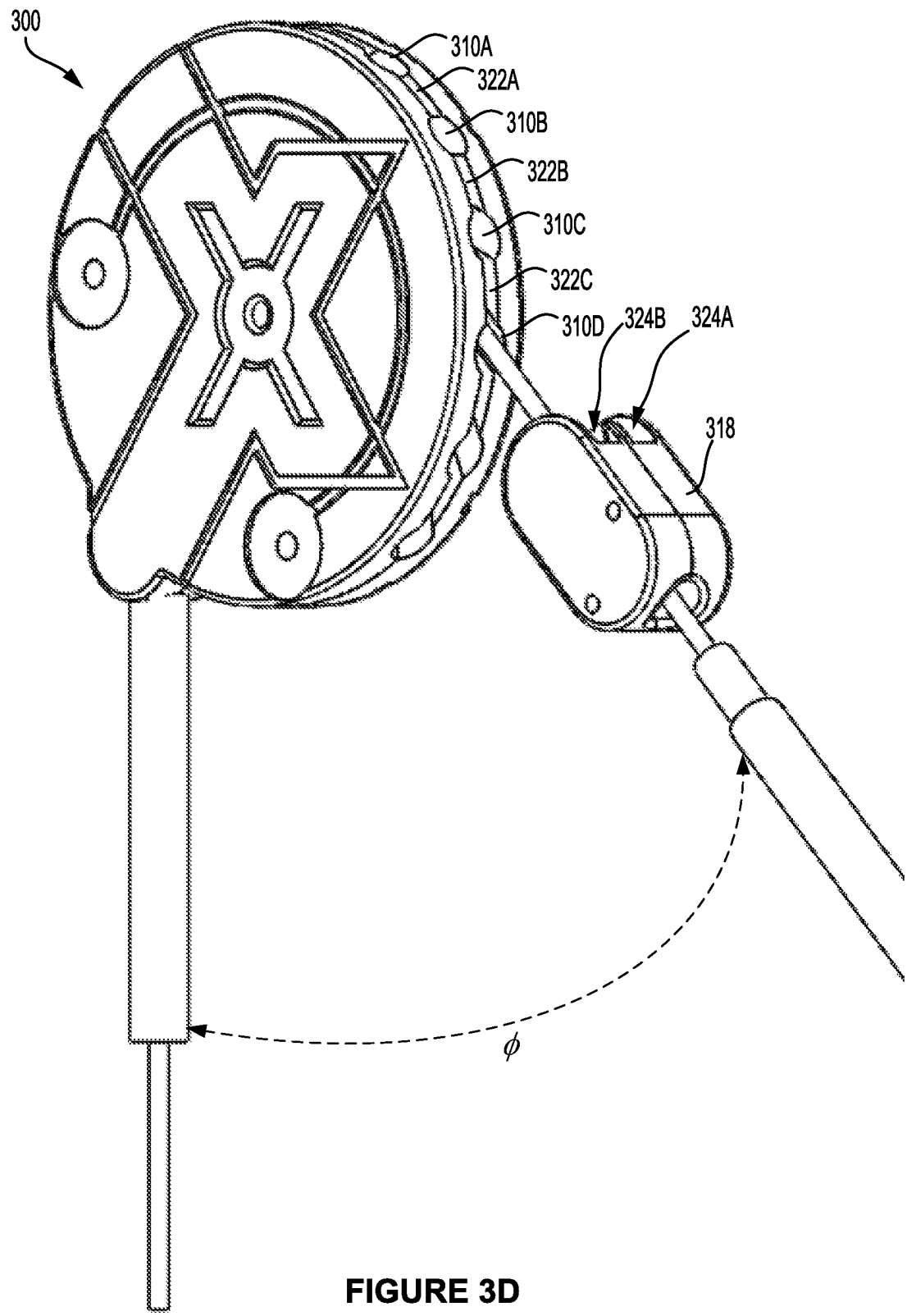
FIG. 3D illustrates an exploded view of the apparatus shown in FIG. 3A, in accordance with an example implementation.

To illustrate changing the angle φ of the Bowden cable, FIG. 3D illustrates an exploded view of the apparatus 300. As shown in FIG. 3D, the outlets 310 are connected by slots. For instance, the outlet 310A and outlet 310B are connected by a slot 322A; the outlet 310B and outlet 310C are connected by a slot 322B; and the outlet 310C and outlet 310D are connected by a slot 322C. The slots 322A-C, and similar slots between respective outlets, are configured to accommodate a width or diameter of the inner cable 308 such that the inner cable 308 can slide through a slot from one outlet to another.

Further, the socket 318 has two U-shaped grooves 324A and 324B that are configured to snap on the housing 302. Particularly, the groove 324A can accommodate the portion of a width of the housing 302 between any of the slots 322A-C, for example, and an outer back wall of the housing 302. Similarly, the groove 324B can accommodate the portion of the width of the housing 302 between any of the slots 324A-C, for example, and an outer frontal wall of the housing 302.

Figure 3E:
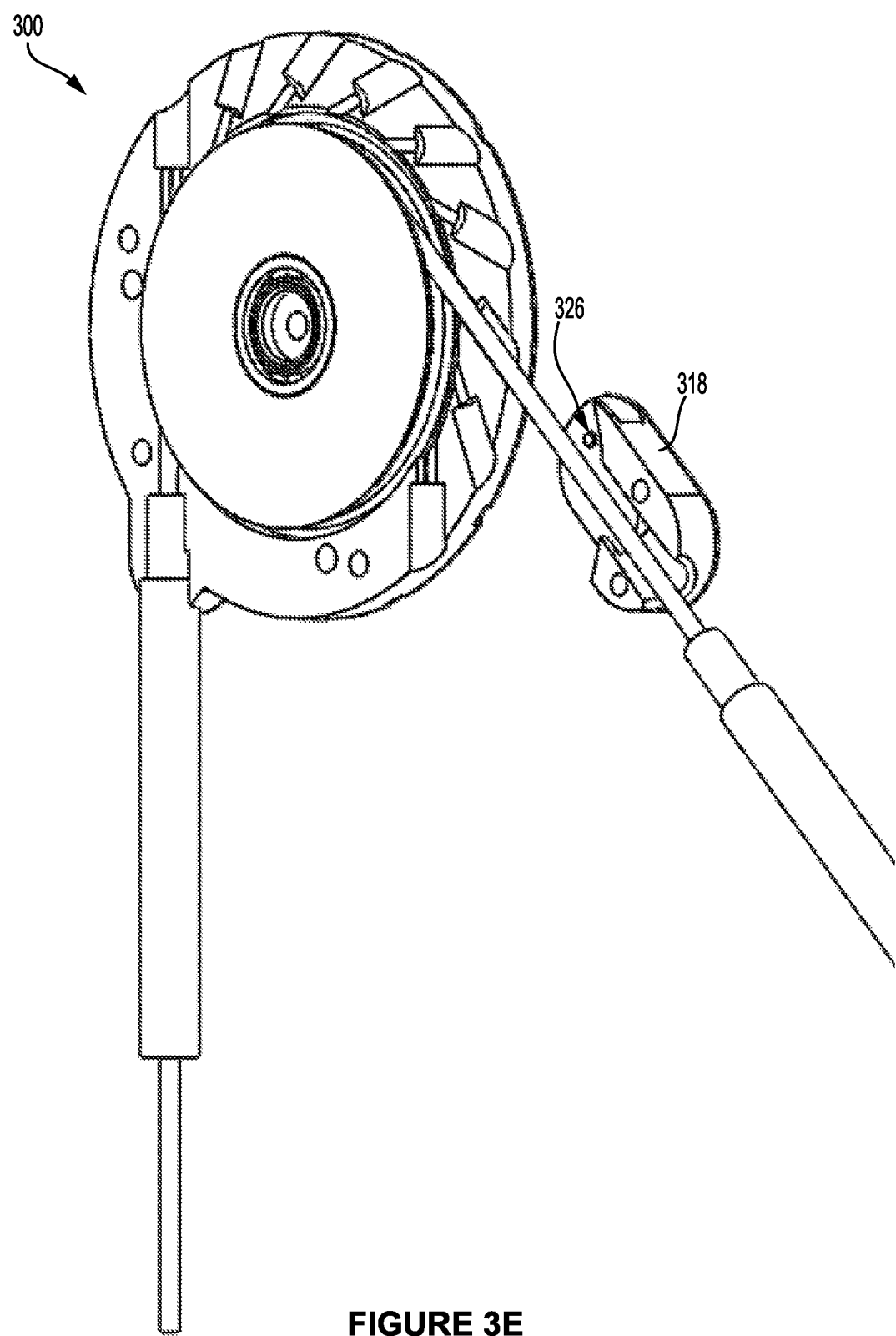
FIG. 3E illustrates an exploded view of a portion of the apparatus in FIG. 3D, in accordance with an example implementation.
Figure 3F:
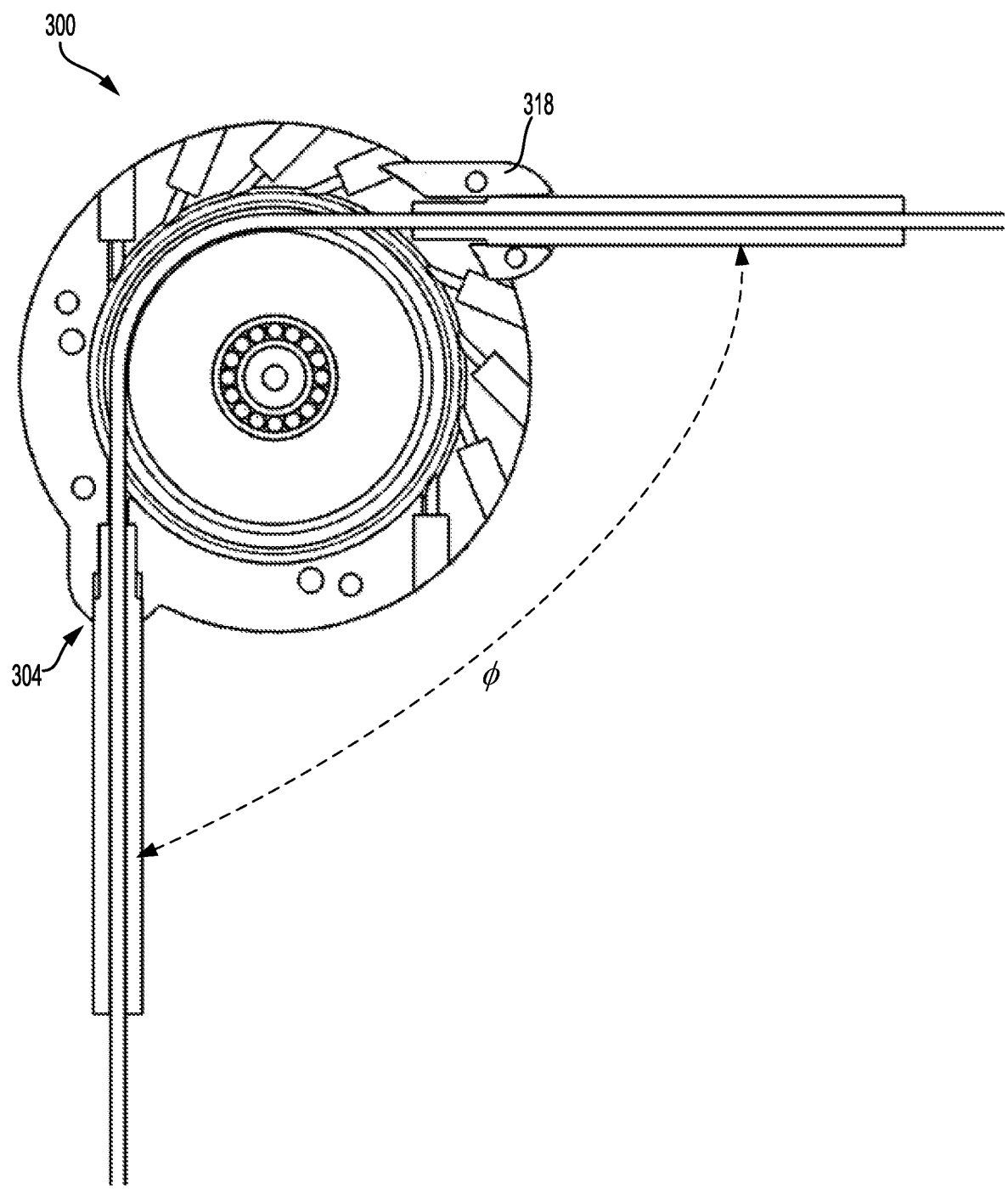
FIG. 3F illustrates a side view of the apparatus illustrated in FIGS. 3A-3E with a Bowden cable forming a 90° angle, in accordance with an example implementation.

Further, a snap configuration may be used to secure the socket 318 is a particular position about the housing 302. For instance, as shown in FIG. 3E, the socket 318 may have a protruding male portion 326 that protrudes from an internal surface of the socket 318. The back wall of the housing 302 may have a corresponding recessed female portion (not shown) corresponding to the male portion 326. In this manner, when the socket 318 is pushed radially inward unto the housing 302, the socket 318 may snap onto the wall of the housing 302, by way of the male portion 326 engaging the corresponding female portion. It is noted that only one half of the socket 318 is shown in FIG. 3E. The other half may also include another male portion similar to the male portion 326 to snap on the frontal wall of the housing 302.

FIGS. 3A, 3B, 3C, and 3D illustrate the apparatus 300 with the Bowden cable forming an angle φ of 135°, i.e., the angle φ between the inlet 304 and the outlet 310D is 135°. Assuming that there is a desire to change the angle φ of the Bowden cable from to 135° to 90°, an operator may slide the socket 318 radially outward with a force sufficient to overcome the snap engagement of the socket 318 to the housing. Referring back to FIG. 3D, the operator may then move the socket counter-clockwise about the periphery of the housing 302, thus sliding the inner cable 308 from the outlet 310D through the slot 322C, the outlet 310C, and the slot 322B to the outlet 310B. When positioned at outlet 310B, the Bowden cable forms a 90° angle to the inlet 304. The operator may then slide the socket 318 radially inward again and snap the socket 318 in the position shown in FIG. 3F. In another configuration, the operator might not slide the socket 318 radially outward and again radially inward, but may merely slide the socket 318 about the periphery of the housing 302 after initially using sufficient force to disengage the snap configuration.

Thus, the angle φ can be quickly adjusted with no disassembly by disengaging the socket 318 from a selected outlet and re-engaging it at another outlet. Further, this angle adjustment could be performed after an entire drive train has been assembled.

FIGS. 3A-3F show that the outlets 310 are disposed about a portion of the circumference or periphery of the housing 302. In an example, the outlets 310 may span a portion such that the angle φ between the incoming Bowden cable at the inlet and the outgoing Bowden at the outlet cable vary from 0° to 270°. In another example, the angle could range from 0° to 360°.

In this manner, the apparatus 300 could be used to change direction of a line of transmission through a set angle. Several apparatuses 300 could be used to route the line of transmission, and the respective angles of the apparatuses could be adjusted before operation so that during peak power transmission, all Bowden cables are substantially straight. It is noted that only the inner cable 308, without the sleeve 306, is wrapped about the inner hub 314. Thus, the sleeve 306 is not bent, which also reduces friction between the inner cable 308 and the sleeve 306. As a result, equation (1) set forth above does not apply.

Further, over the entire range of motion, the Bowden cable bending is reduced due to the inner cable 308 being wrapped about the inner hub 314. Friction could also be reduced due to the inner hub 314 being rotatably mounted within the housing 302 and is thus allowed to rotate as the inner cable 308 translates.

Figure 4:
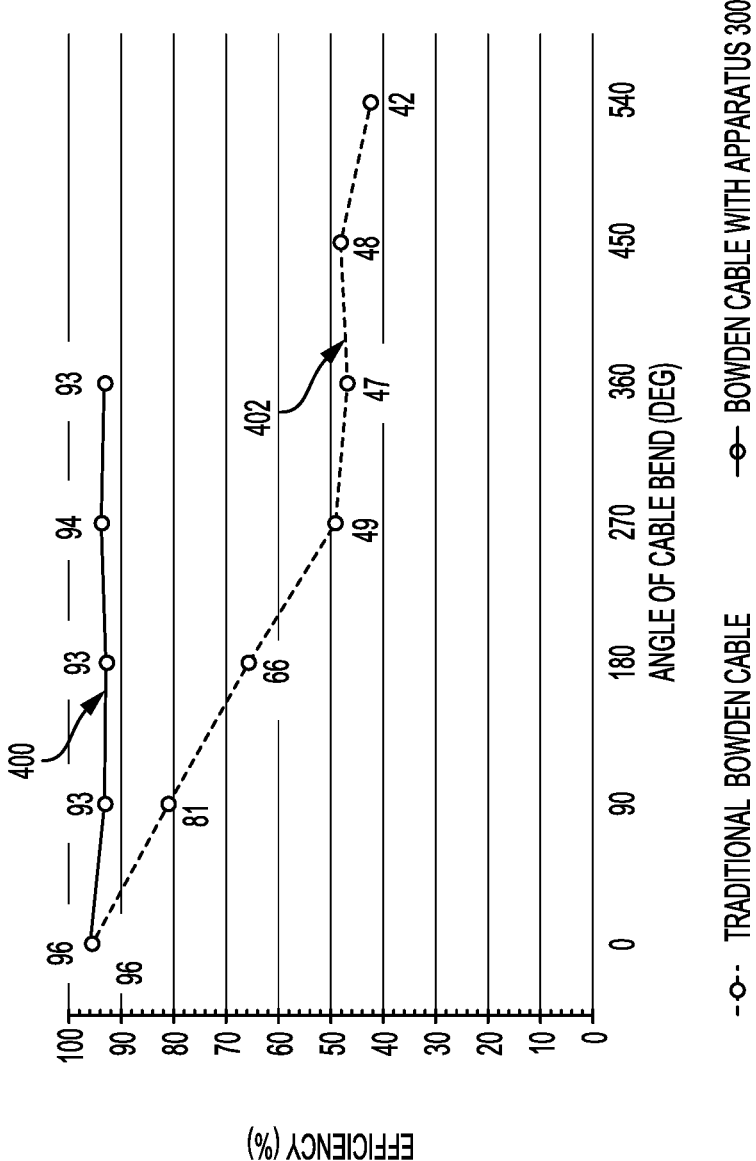
FIG. 4 is a graph showing an efficiency comparison between a traditional Bowden cable and a Bowden cable system employing the apparatus illustrated in FIG. 3A, in accordance with an example implementation.

FIG. 4 is a graph showing an efficiency comparison between a traditional Bowden cable and a Bowden cable system employing the apparatus 300, in accordance with an example implementation. Line 400 represents variation of efficiency with an increase in the bending angle for the Bowden cable system employing the apparatus 300, whereas line 402 represents variation of efficiency with an increase in the bending angle for the traditional Bowden cable. As shown in FIG. 4, both the traditional Bowden cable and the system employing the apparatus 300 have essentially the same efficiency (≅ i.e., 96%) when a bending angle of the Bowden cable is 0°.

However, the lines 400 and 402 deviate dramatically from each other as the bending angle increases. For example, at a bending angle of 360°, the efficiency for the system having the apparatus 300 is ≅93%, whereas the efficiency of the traditional Bowden cable is ≅47%. This indicates that more than 50% of the input energy is lost due to friction when a traditional Bowden cable is used, as opposed to less than 7% when the apparatus 300 is used. The 50% energy loss for the traditional Bowden cable is dissipated as heat in the system that could damage the Bowden cable itself (e.g., the Bowden cable could melt due to the heat generated by friction). This damage, however, might not occur if the apparatus 300 is used. Thus, the apparatus 300 provides a highly efficient component that could be made from light weight material for use in mechanical power transmissions systems.

III. EXAMPLE SELF-LOCKING APPARATUS CONFIGURATION

Figure 5A:
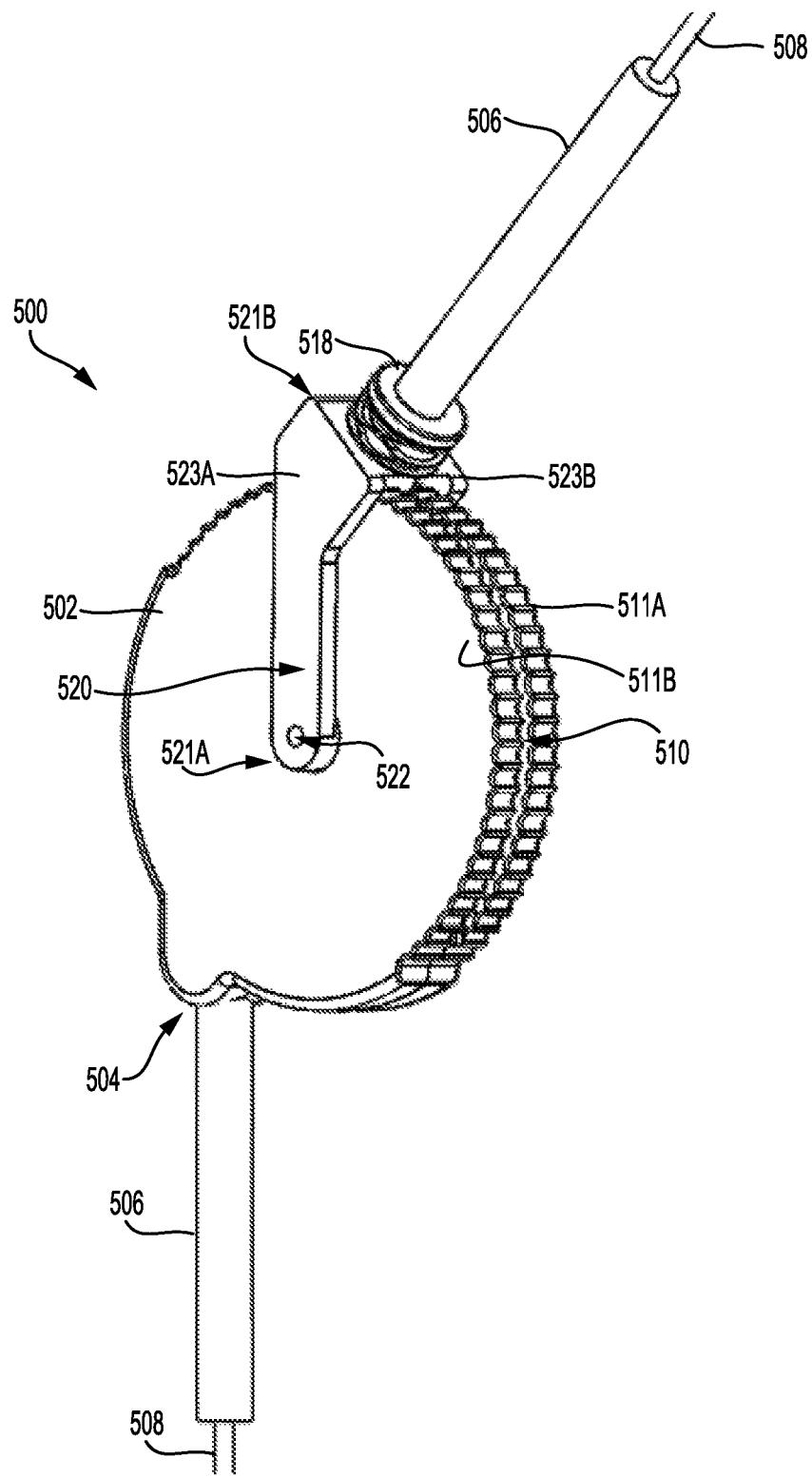
FIG. 5A illustrates a perspective view of a self-locking apparatus configured to reduce friction in a Bowden cable, in accordance with an example implementation.

FIGS. 5A, 5B, 5C, 5D, and 5E illustrate a self-locking apparatus 500 configured to reduce friction in a Bowden cable, in accordance with an example implementation. FIG. 5A illustrates a perspective view of the apparatus 500 and shows that the apparatus 500 includes a housing 502. The housing 502 is shown as a generally circular body, but could have other shapes as well. The housing 502 has an inner space therein, and an inlet 504 connected to the inner space.

The inlet 504 is configured to receive a Bowden cable having a sleeve 506 and an inner cable 508. The sleeve 506 could be similar to the sleeve 102 and/or the sleeve 104 discussed with respect to FIG. 1. The housing 502 allows the inner cable 508 to pass therethrough such that the inner cable 508 passes through the inlet 504, the inner space within the housing 302, and an outlet slot 510. The outlet slot 510 spans a portion of a circumference or a peripheral surface of the housing 502. The portion spanned by the outlet slot 510 determines a range of angles that is possible between an incoming Bowden cable going through the inlet 504 and an outgoing Bowden cable going through the outlet slot 510.

The housing 502 is shown in FIG. 5A as having two opposing circular plates 511A and 511B. However, in other example implementations, the housing could be made of a single body with the outlet slot 510 disposed therein as a groove or channel along a portion of the circumference of the housing 502.

Figure 5B:
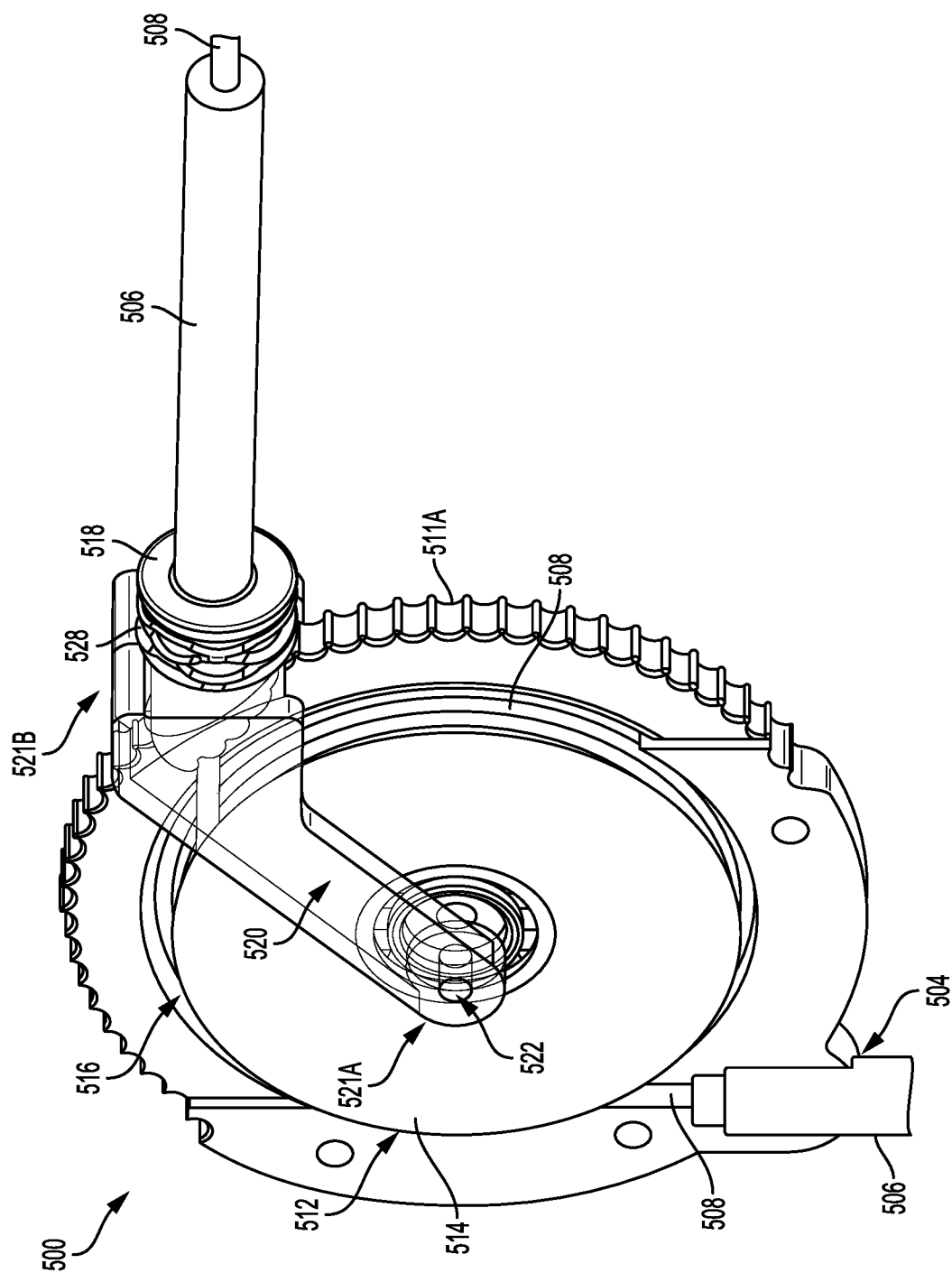
FIG. 5B illustrates a partial perspective view of the apparatus shown in FIG. 5A, in accordance with an example implementation.

FIG. 5B illustrates a perspective view of a portion of the apparatus 500. Specifically, the circular plate 511B is removed to show an inner space 512 of the housing 502. The apparatus 500 includes an inner hub 514 that is rotatably mounted in the inner space 512 of the housing 502. In an example, the inner hub 514 may have a circular groove 516 disposed on a periphery of the inner hub 514. The circular groove 516 is configured to receive and guide the inner cable 508 of the Bowden to form a curved path about the inner hub 514. In another example, the inner hub 514 might not have a groove, and the inner cable 508 could form the curved path about the inner hub 514 itself. It is noted that only the inner cable 508 is curved about the inner hub 514, while the sleeve 506 remains straight at the inlet 504 or at the outlet.

The apparatus 500 also includes a socket 518 configured to receive the Bowden cable emanating through a portion of outlet slot 510. The socket 518 may be configured to receive a portion of the sleeve 506 as well as the inner cable 508. The socket 518 can be coupled to the housing 502 at a plurality of different positions to select any of a plurality of different portions of the outlet slot 510 such that the inner cable 508 of the Bowden cable passes through the selected portion of the outlet slot 510. In this manner, the inner cable 508 emanating from the socket 518 forms an angle to the incoming cable received at the inlet 504 to route the Bowden cable.

Referring to both FIGS. 5A and 5B, the apparatus 500 further includes an arm 520 having a first end 521A and a second end 521B. The first end 521A is pivotally mounted to the housing 502 at a pivot or axle 522, and thus the arm 520 is configured to rotate or swing about the housing 502. FIGS. 5A and 5B illustrate the pivot or axle 522 being the same axis of the inner hub 514; however, in other example implementations, the arm 520 could be mounted to the housing 502 at other axes or pivot points to reduce the moment on the arm 520.

The second end 521B is coupled to the socket 518, such that the socket is able to swing on, and with, the arm through the range of angles defined by the outlet slot 510 as described below. In an example, the arm 520 may have two sides 523A and 523B linked together at the socket 518, and the housing 502 may be disposed therebetween.

Figure 5C:
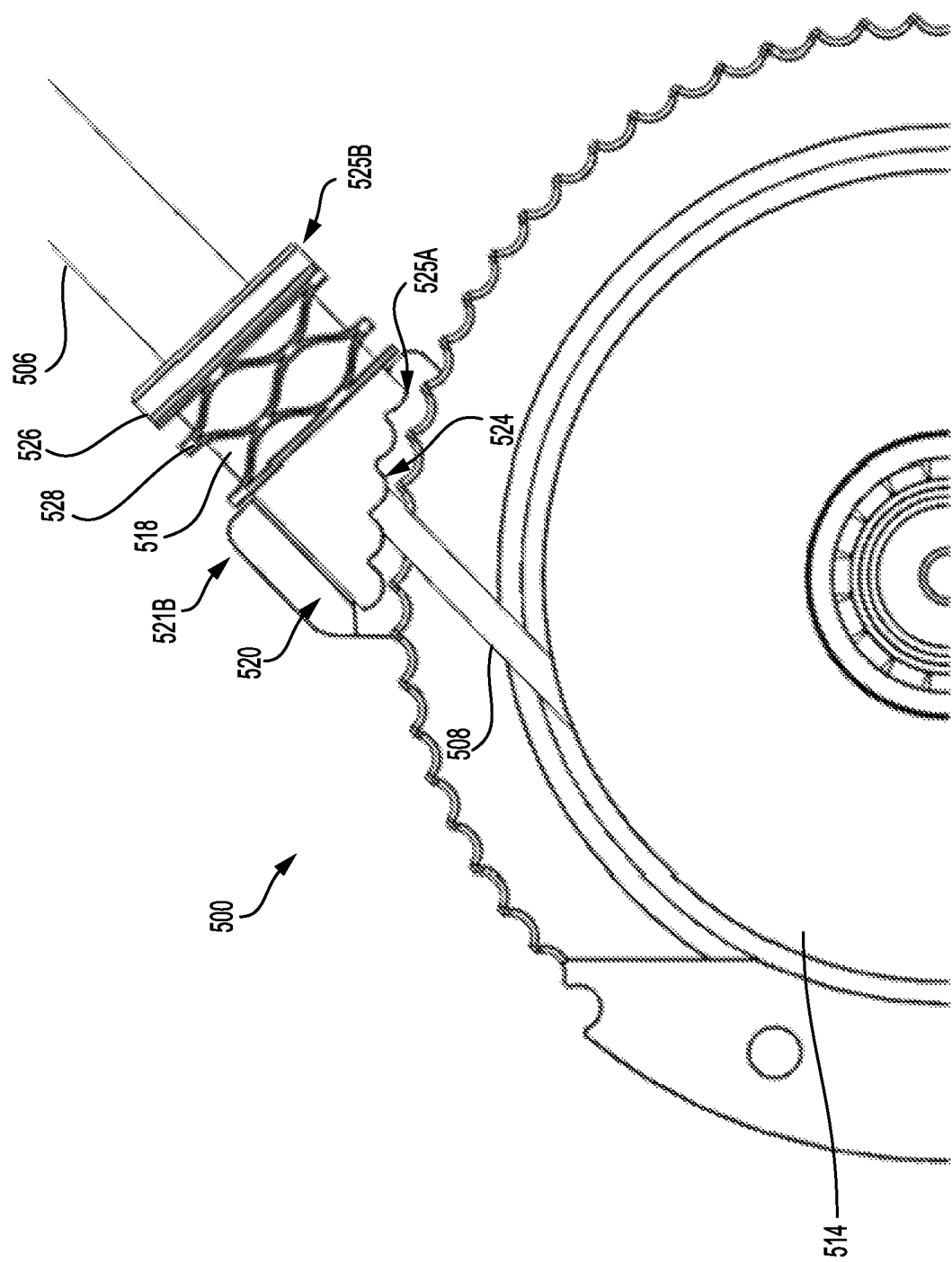
FIG. 5C illustrates a partial side view of a portion of the apparatus shown in FIG. 5A with a socket disengaged from a housing of the apparatus, in accordance with an example implementation.

As shown in FIGS. 5A and 5B, the housing 502 has a plurality of teeth disposed on the circumference of the housing 502 in the range of angles corresponding to the outlet slot 510. FIG. 5C illustrates a partial cross section of the apparatus 500 to show that the socket 518 has teeth 524 that can engage subsets of the plurality of teeth on the housing 502. Particularly, the socket 518 has a proximal end 525A having the teeth that can engage the subsets of the plurality of teeth of the housing 502, thus fixedly mounting the socket 518 to the housing 502 causing the outgoing Bowden cable to have a particular angle with respect to the incoming Bowden cable. The socket 518 also has a distal end 525B that is coupled to the sleeve 506 of the Bowden cable.

Further, as shown in FIG. 5C, the socket 518 has a shoulder 526 formed at the distal end 525B. A spring 528 is mounted between the shoulder 526 and the second end 521B of the arm 520. The spring 528 is shown as a wave spring in FIGS. 5A-5C; however, any other type of a compression spring could be used.

FIG. 5C also illustrates that the socket 518 is slidably accommodated at the second end 521B of the arm 520. Thus, the socket 518 can slide within arm 520. When the inner cable 508 is not under tension, or when the tension is below a threshold tension value, the spring 528 causes the socket 518 to slide outwardly. As a result, the teeth 524 of the socket 518 disengage from the teeth of the housing 502. The threshold tension value could, for example, be related to a spring rate of the spring 528, and may depend on an application in which the apparatus 500 is used. For instance, the threshold value could be 2% of the peak output load (e.g., 2-5 Newtons). In this state, the socket is free to rotate about the periphery or circumference of the housing 502, i.e., the socket 518 is in a floating state.

When the inner cable 508 is subjected to tension, the sleeve 506 is subjected to compression, and the sleeve 506 attempts to push the socket 518 inwardly against the spring 528. Once the tension exceeds the threshold tension value related to the spring rate of the spring 528, the sleeve 506 pushes the socket 518 inwardly, causing the shoulder 526 to compress the spring 528 against the end 521B of the arm 520.

Figure 5D:
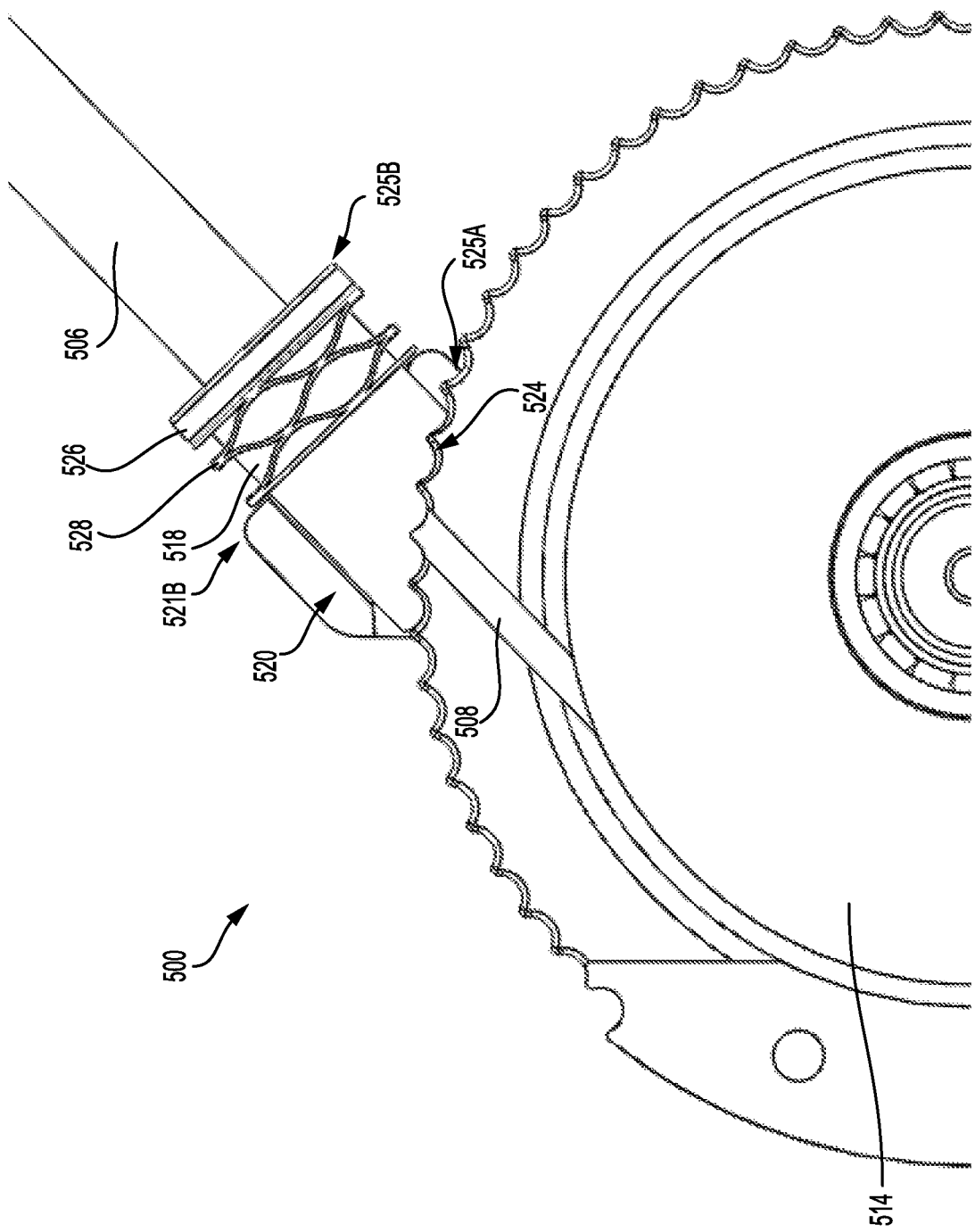
FIG. 5D illustrates the apparatus shown in FIG. 5C with the socket engaged with the housing of the apparatus, in accordance with an example implementation.

As a result, the teeth 524 engage the corresponding subset of teeth of the housing 502 based on a current position of the socket 518. This state is shown in FIG. 5D. The socket 518 is thus fixedly mounted at a position where the inner cable 508 passes through the outlet slot 510 and the teeth 524 engage a corresponding subset of teeth on the circumference of the housing 502. Once the socket 518 is fixedly mounted at the position, the angle between the incoming Bowden cable at the inlet 504 is fixed relative to the outgoing Bowden cable.

As such, the apparatus 500 is configured to operate in two modes based on a magnitude of tension in the inner cable 508. In the first mode, tension in the inner cable 508 is low (i.e., below a threshold tension value) or the inner cable 508 is slack. In this first mode of operation, the teeth 524 of the socket 518 are disengaged from the teeth of the housing 502, the socket is floating, and the angle between incoming and outgoing Bowden cables is free to change. In this mode, the housing 502 acts as a passive hinge between Bowden cables. This mode corresponds to the state shown in FIG. 5C.

In the second mode, tension in the inner cable 508 exceeds the threshold value. The tension in the inner cable 508 tends to straighten the Bowden cable and apply a substantial torque of the housing 502 (i.e., on the inner hub 514). However, the configuration of the apparatus 500 prevents that from happening because the socket 518 self-locks onto the housing 502. Particularly, in this second mode, the compression of the sleeve 506 pushes the socket 518 against the spring 528, thus causing the teeth 524 to engage a subset of teeth of the housing 502 at the particular position of the socket 518, as shown in FIG. 5D. The socket 518 is thus self-locked at that position. In this second mode of operation, the socket 518 locks the angle between the incoming and outgoing Bowden cables, so that mechanical work is done at the end of the cable transmission.

Figure 5E:
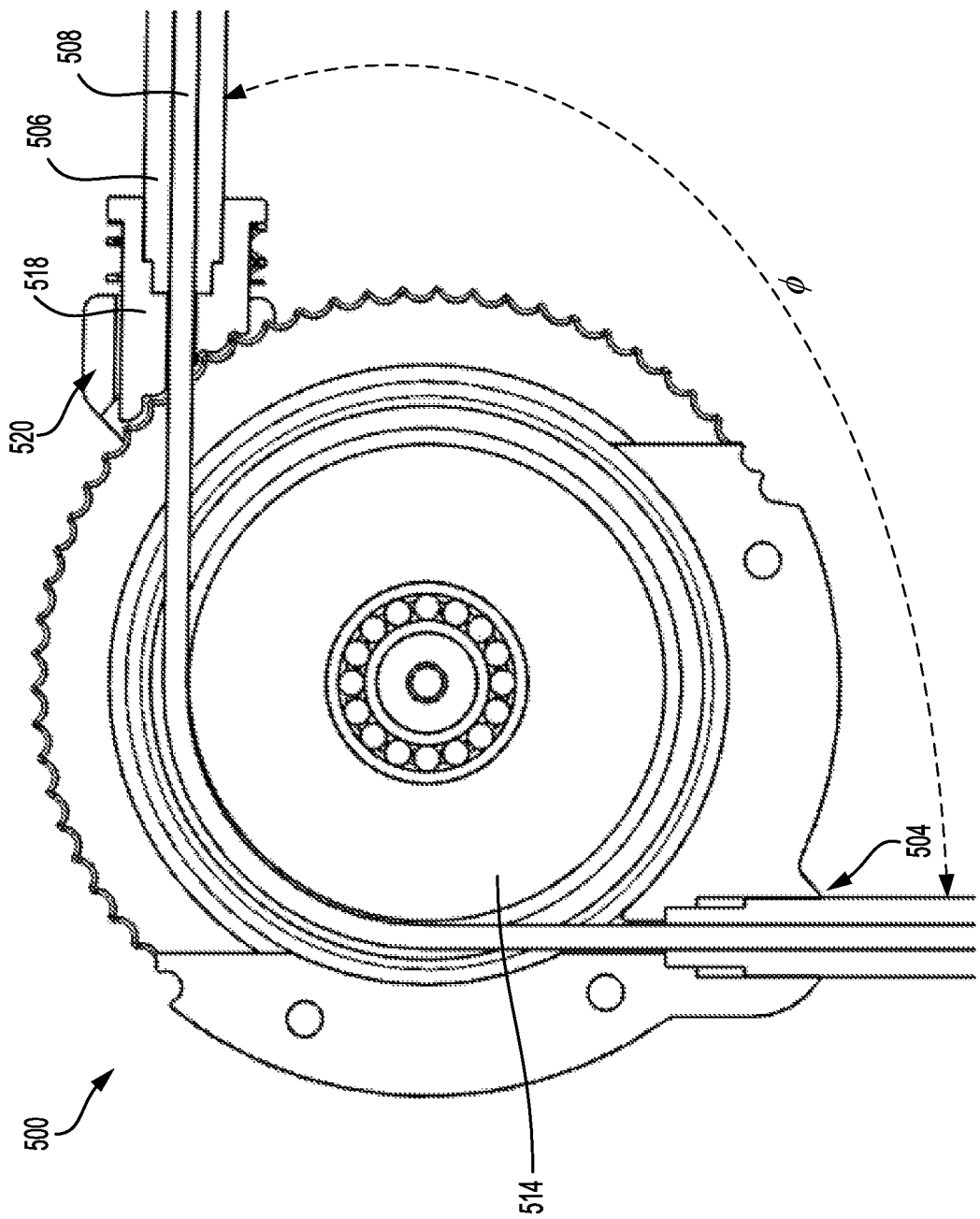
FIG. 5E illustrates a side view of a partial cross section the apparatus shown in FIG. 5A with a Bowden cable forming a 90° angle, in accordance with an example implementation.

Once the tension is removed or falls below the threshold value, the apparatus 500 reverts back to the first mode of operation, and the socket 518 is disengaged from the housing 502. The socket 518 floats passively about the periphery of the housing 502 until tension again increases above the threshold value, and the socket 518 again self-locks on the housing 502. The socket 518 self-locks to the housing 502 at the position at which the socket 518 happens to be when the tension increases beyond the threshold value. For instance, FIG. 5E illustrates a cross section of the apparatus 500 showing the socket 518 self-locking at a position at which the Bowden cables form a 90° angle φ.

The apparatus 500 has similar advantages related to friction reduction as the apparatus 300. Further, in many cases, the two modes of operation of the apparatus 500 will increase total efficiency, because the apparatus 500 will passively minimize the total curvature of the Bowden cable over a wide range of load paths and joint angles.

Figure 5F:
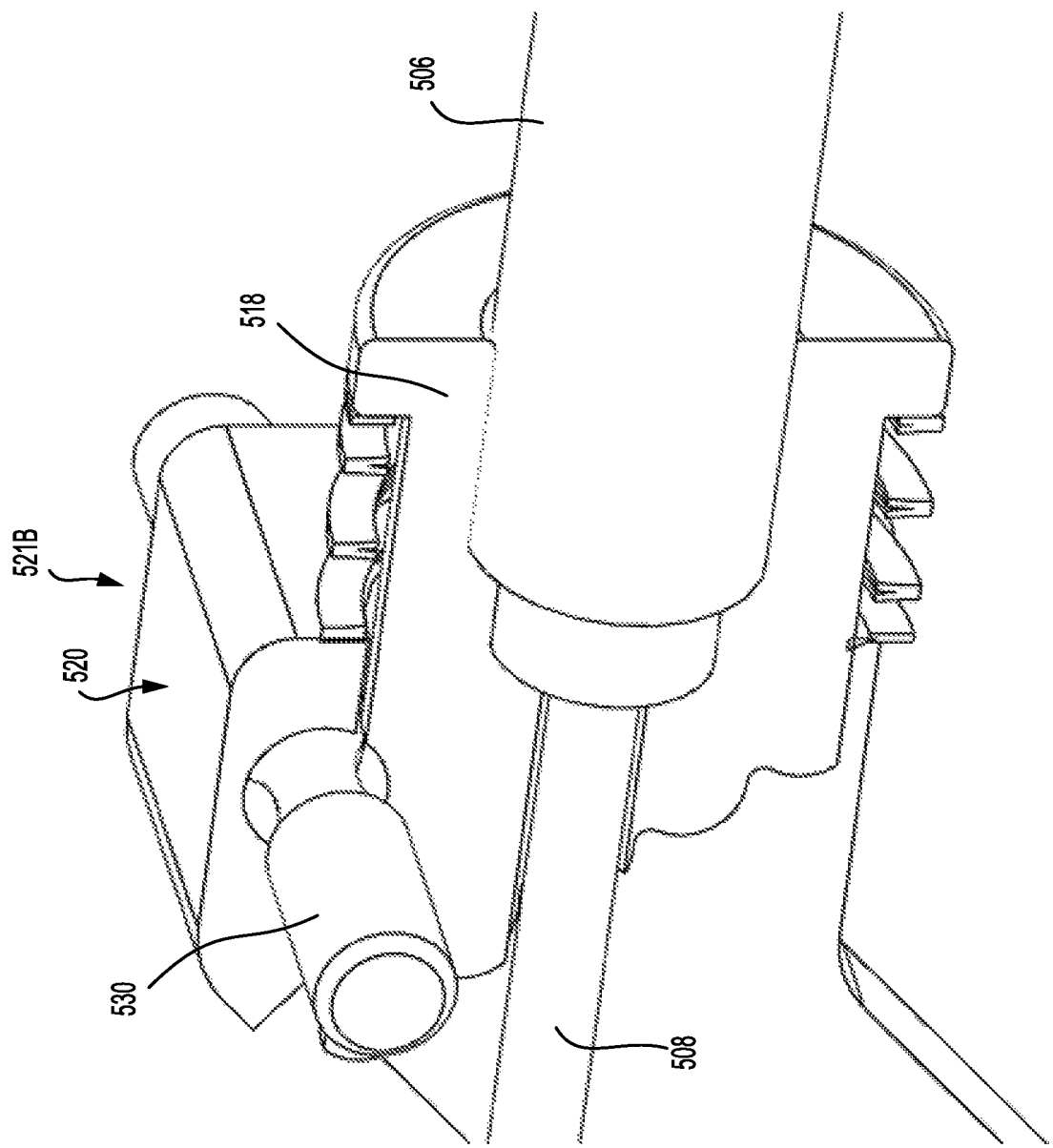
FIG. 5F illustrates a pin locking mechanism with a pin in an unlocked position, in accordance with an example implementation.

The apparatus 500 can be further modified to have a manual locking feature that fixes the angle between Bowden cables. In this way, the apparatus 500 could operate similar to the apparatus 300, wherein the angle between Bowden cables could be manually adjusted. FIG. 5F illustrates a pin locking mechanism with a pin 530 in an unlocked position, in accordance with an example implementation. The illustrated pin locking mechanism is an example configuration to implement the manual adjustment for the apparatus 500.

As shown in FIG. 5F, a pin 530 passes through the arm 520 at the second end 521B and also passes through the socket 518. The pin 230 may be configured to operate as a push button. When the pin 530 is in the position shown in FIG. 5E, the socket 518 is disengaged from the housing 502, and the socket 518 could float passively about the housing 502 if the tension in the inner cable 508 is below the threshold value.

Figure 5G:
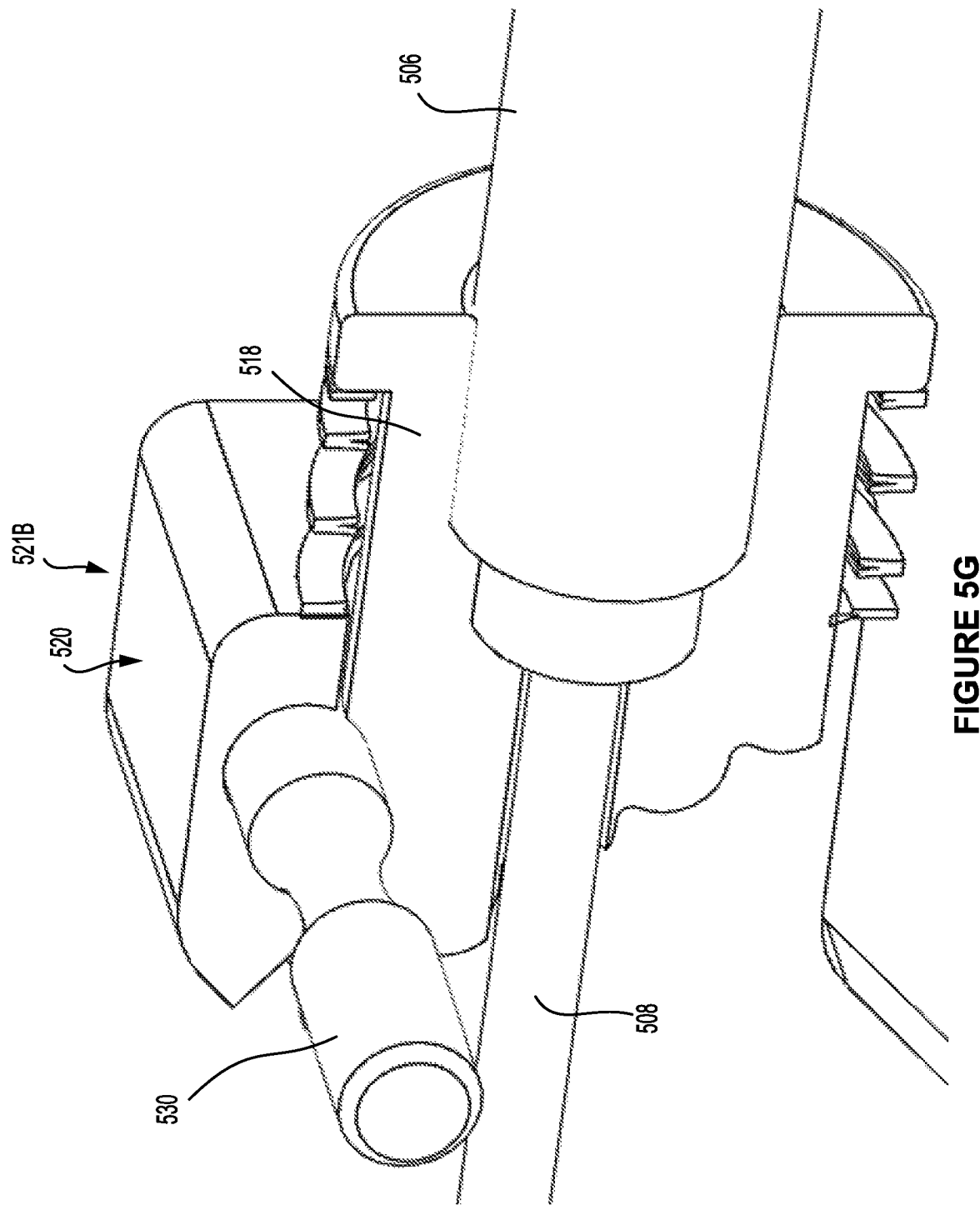
FIG. 5G illustrates the pin locking mechanism of FIG. 5F with the pin in a locked position, in accordance with an example implementation.

If the tension rises above the threshold value and the socket 518 engages the housing 502, the pin 530 could be manually pushed into the arm 520 to engage the socket 518 and lock the socket 518 in place while the socket 518 is fully engaged with the housing 502. FIG. 5G illustrates the pin locking mechanism with the pin 530 in a locked position, in accordance with an example implementation. As shown in FIG. 5G, the pin 530 is pushed further compared to FIG. 5F so as to engage the socket 518 and keep the socket 518 in full engagement with the housing 502 even when tension in the inner cable 508 again falls below the threshold tension value.

IV. CONCLUSION

It should be understood that arrangements described herein are for purposes of example only. As such, those skilled in the art will appreciate that other arrangements and other elements (e.g., machines, interfaces, orders, and groupings of operations, etc.) can be used instead, and some elements may be omitted altogether according to the desired results.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. An apparatus comprising:
  a housing that includes a circumference, a plurality of teeth disposed on the circumference, and an inner space, wherein the circumference includes a closed portion and an open portion, the open portion including an inlet connected to the inner space and an outlet slot connected to the inner space, wherein the outlet slot spans a range of angles relative to the inlet, wherein the housing allows an inner cable of a Bowden cable to pass therethrough such that the inner cable passes through the inlet, the inner space, and the outlet slot;
  an inner hub rotatably mounted in the inner space of the housing, wherein the inner hub is configured to receive and guide the inner cable passing through the housing such that the inner cable forms a curved path about the inner hub;
  a socket configured to receive the inner cable of the Bowden cable and a portion of a sleeve of the Bowden cable, wherein the socket can be coupled to the housing at a plurality of different positions to select any of a plurality of different portions of the outlet slot such that the inner cable of the Bowden cable passes through a selected portion of the plurality of different portions of the outlet slot;
  an arm having a first end and a second end, wherein the first end is pivotally mounted to the housing and the second end is coupled to the socket, such that the socket is able to swing on the arm through the range of angles corresponding to the outlet slot; and
  a spring disposed between the socket and the second end of the arm.

2. The apparatus of claim 1, wherein the plurality of teeth disposed on the circumference spans the range of angles corresponding to the outlet slot.

3. The apparatus of claim 2, wherein the socket has a proximal end and a distal end, wherein the proximal end has teeth configured to engage subsets of the plurality of teeth on the housing, and the distal end comprises an opening configured to receive the portion of the sleeve of the Bowden cable.

4. The apparatus of claim 3, wherein the socket is slidably accommodated within the arm at the second end of the arm.

5. The apparatus of claim 4, wherein:
the spring is mounted to the socket between a shoulder formed at the distal end of the socket and the second end of the arm.

6. The apparatus of claim 5, wherein:
the spring is configured such that, when tension in the inner cable exceeds a predetermined threshold tension, the sleeve of the Bowden cable pushes the socket toward the housing, such that the spring is compressed and the teeth of the socket engage a particular subset of the subsets of the plurality of teeth on the housing.

7. The apparatus of claim 6, wherein:
the spring is further configured such that, when tension in the inner cable is less than the predetermined threshold tension, the spring pushes the socket away from the housing, such that the teeth of the socket disengage from the particular subset of the plurality of teeth on the housing.

8. The apparatus of claim 7, wherein, when tension in the inner cable is less than the predetermined threshold tension, the socket floats about the circumference of the housing and is configured to freely rotate with the arm about the circumference.

9. The apparatus of claim 1, wherein the housing comprises two opposing circular plates coupled to each other and separated by a gap that forms the outlet slot.

10. The apparatus of claim 1, wherein the spring is a compression spring.

* * * * *